Sept. 6, 1938.  J. FLAMMANG ET AL  2,129,351
MOLDING MACHINE
Filed July 20, 1936   2 Sheets-Sheet 1
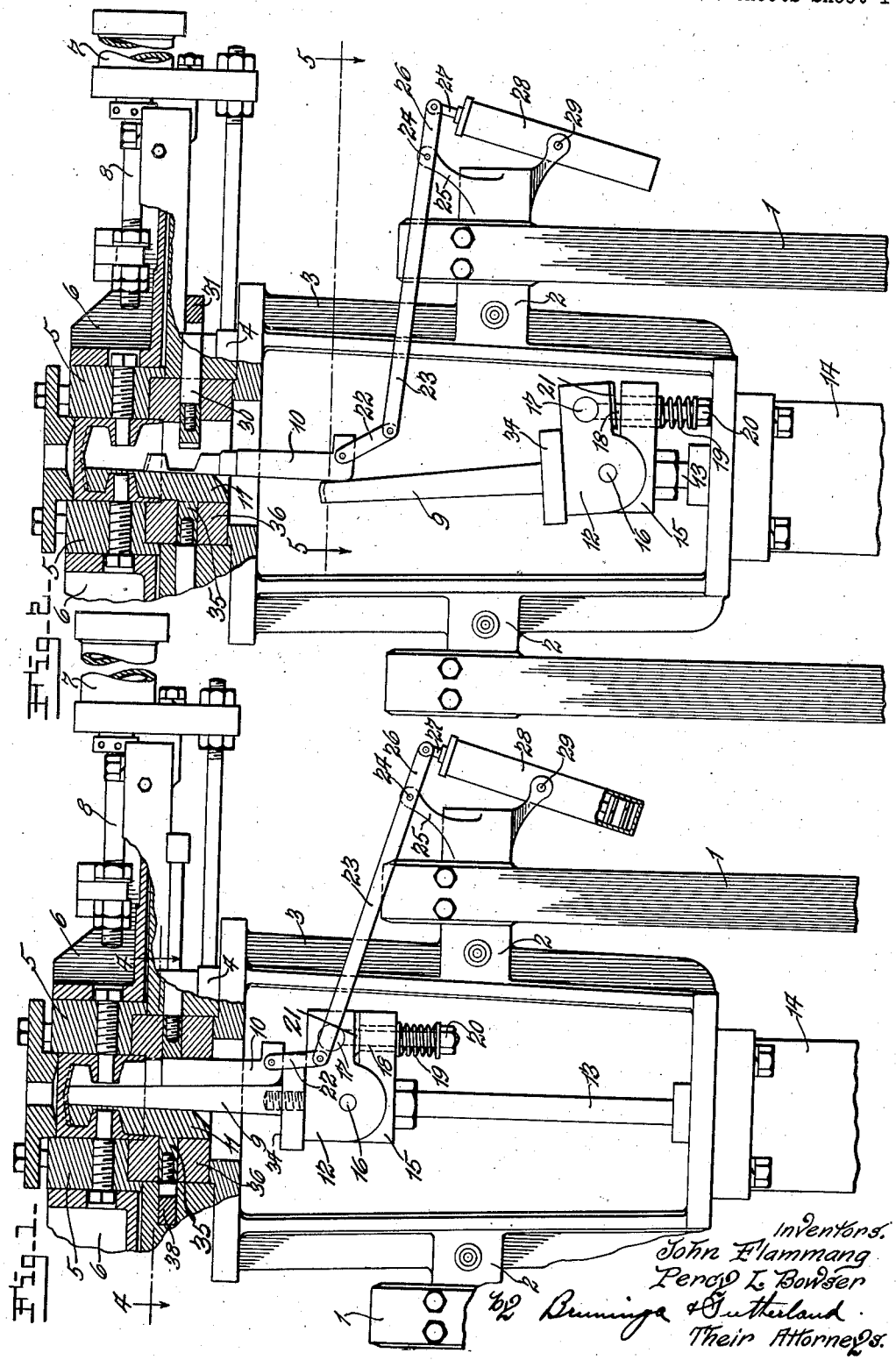
Inventors.
John Flammang
Percy L. Bowser
By Bruninga & Sutherland
Their Attorneys.

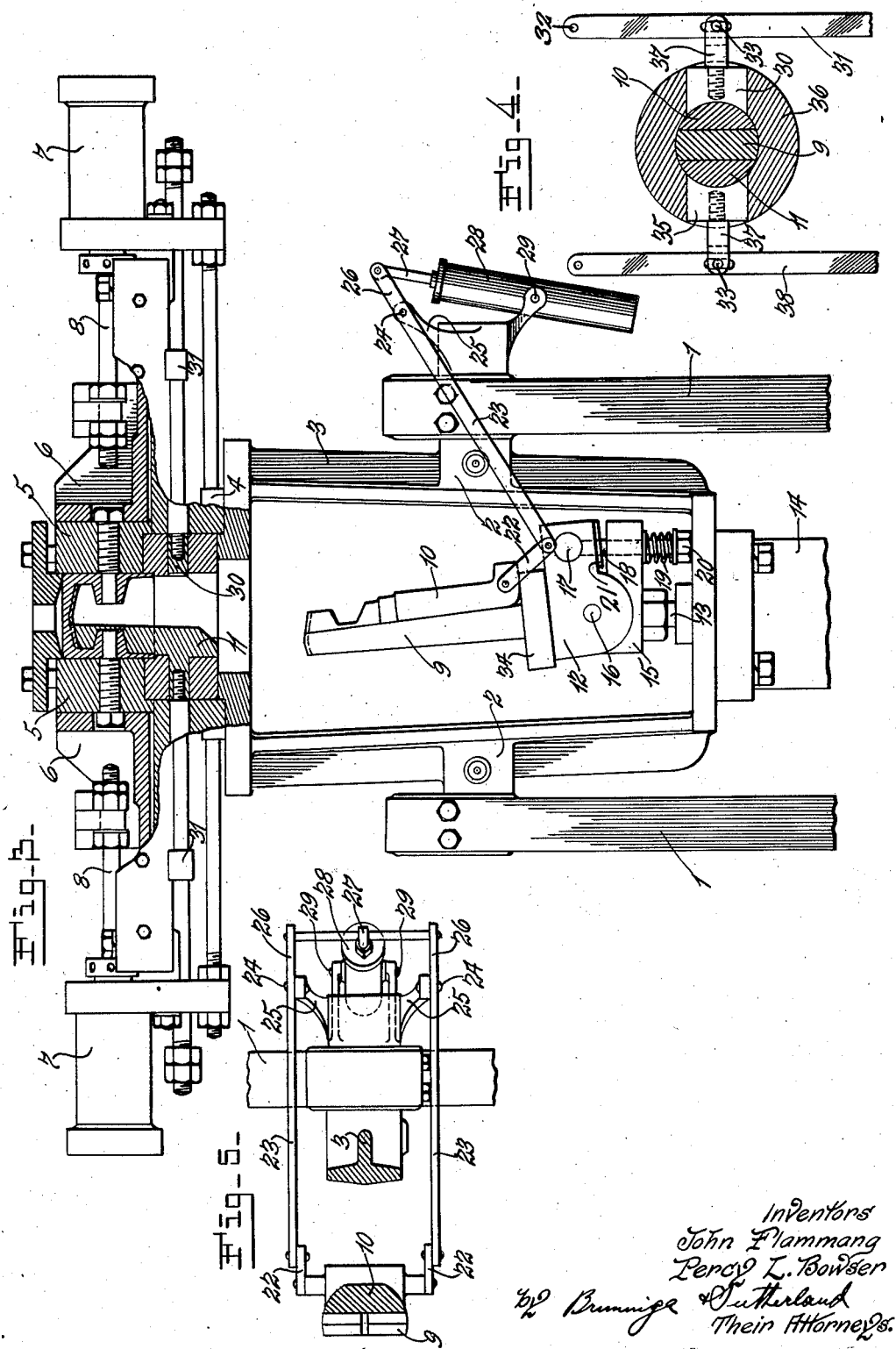

Patented Sept. 6, 1938

2,129,351

UNITED STATES PATENT OFFICE 2,129,351

MOLDING MACHINE

John Flammang and Percy L. Bowser, St. Louis, Mo., assignors to The Sterling Corporation, St. Louis, Mo., a corporation of Delaware Application July 20, 1936, Serial No. 91,487

13 Claims. (Cl. 22—93)

This invention pertains to molding machines and more particularly to a machine for molding cup shaped castings such as trunk pistons.

The ordinary trunk piston has a pair of inwardly extending bosses provided for the wrist pin bearing and consequently, in order to successfully cast a shape of this type, it is necessary to employ a sectional core. Such a core is ordinarily made in three or more sections. A three-section core is withdrawn from the casting by first drawing out the center section and then moving the side sections laterally into the space vacated by the center section. In some types of pistons the wrist pin bosses extend inwardly so far that the space between them vacated by withdrawing the center core section is not sufficient to permit both the side sections to be withdrawn through that space simultaneously as is the usual practice.

One of the objects of this invention, therefore, is to provide a molding machine arranged so that the side core sections may be withdrawn one at a time through the space vacated by withdrawing the center section.

Another object is to provide such a machine whereby the handling of the core sections during such withdrawal may be made automatic.

Another object is to provide means for controlling the movement of the different core sections in such a manner as to move them out successively and in proper paths so as to avoid interference with the casting.

Another object is to provide such controlling means which will render the operation smooth and rapid and which will automatically prepare the core sections for reassembly in the mold.

Further objects will appear from the following description taken in connection with the accompanying drawings in which Figure 1 is a front view partly in section illustrating a molding machine embodying this invention showing the core parts in casting position.

Figure 2 is a similar view showing the core parts partly withdrawn.

Figure 3 is a similar view showing the core parts completely withdrawn.

Figure 4 is a detail section on line 4—4 of Figure 1, and

Figure 5 is a detail section on line 5—5 of Figure 2.

Referring now to the drawings, 1 represents the frame or support for the machine. Carried in trunnions 2 on the frame 1 is a supporting bracket 3 upon which is mounted a horizontally extending base 4. The mold is formed in separable half sections 5 each supported upon a carrier 6 mounted for sliding movement on the base 4. The sliding of these carriers to separate the mold sections 5 and also to reassemble the same is produced by fluid pressure cylinders 7 acting through their piston rods 8 connected to the carriers 6.

The core for the mold is composed in the case illustrated of three sections, namely a center section 9 and side sections 10 and 11. The center section 9 is mounted on a rocking head 12 carried by the piston rod 13 of a fluid pressure cylinder 14 mounted on the lower end of the bracket 3. By controlling the pressure in the cylinder 14 the rod 13 may be lowered to withdraw the core section 9 from the mold and raised to return the same to the mold. Any suitable means not shown may be used to control the admission of pressure to the cylinders 7 and 14 so as to separate the mold sections 5 and withdraw the core sections in proper order. Such control devices are fully described in Patent No. 1,952,200 issued to John Flammang, Percy L. Bowser and Herman Ernst March 27, 1934.

In the mold illustrated the space vacated by the core section 9 upon withdrawal is too narrow to accommodate more than one of the side core sections for withdrawing the same from the casting. Accordingly, after the section 9 has been withdrawn one of the side sections namely the section 10 must be withdrawn first after which the other side section is moved into the space vacated by the section 9 so as to free the casting. Furthermore, as the section 10 must be moved downwardly during withdrawal along practically the same path followed by the section 9 it is necessary that the section 9 be moved out of that path in order to clear the same for the section 10. In order to accomplish this purpose, the piston rod 13 has mounted thereon a block 15 upon which the head 12 is pivoted at 16. The head 12 also carries a pivot pin 17 positioned laterally of the pivot 16 and to which is connected a downwardly extending tension rod 18 passing through a clearance hole in the block 15. A spring 19 mounted on the rod 18 and retained by a nut 20 threaded on the rod retains the head 12 in upright position as shown in Figure 1. The head 12 is provided with a stop-shoulder 21 engaging the top of the block 15 to position the head 12 in upright position. The arrangement is such that when the piston rod 13 moves downwardly the nut 20 or the end of the rod 18 comes into engagement with the lower portion of the bracket 3. This stops the movement of the rod 18 while that of the piston rod 13 continues a slight distance further. As a consequence the head 12 is rocked to the left, Figure 2, on the pivot 16. This throws the upper portion of the core section 9 to one side so as to be out of the path of the side section 10 when it is moved downwardly along practically the same path followed by the section 9.

The side section 10 is preferably mounted upon a pair of links 22 which in turn are carried by a pair of arms 23 pivoted at 24 upon a support 25. The links 22 and the arms 23 are in duplicate, one on the front and the other on the rear of the bracket 3 so as to provide adequate support for the section 10. One or both of the arms 23 are extended beyond the pivot 24 as shown at 26. The extension 26 may be connected to the piston rod 27 of a dash pot 28 pivoted at 29 on the support 25.

In the operation of this mechanism, as soon as the casting has set the core section 9 is withdrawn by operation of the piston rod 13 and as already described. At the completion of its downward movement, it is rocked to one side upon the pivot 16. At this time the side section 10 is still adhering to the interior of the casting. In order to free this section of the casting an ejector 30 is provided operable by a handle 31 pivoted at 32 on the base 4. The operator moves the handle 31 so as to move the ejector 30 to the left, Figure 2. The ejector engages the section 10 and forces it to the left freeing it from the casting and moving it over against the inner surface of the side section 11. At this moment the section 10 is without support except that provided by the arms 23. Accordingly, it now falls by gravity under the control of said arms. The dash pot 28 provides retarding means adapted to control the movement of the section 10 so as to lower it gently from its position just described. The section 10 now descends until it engages the side of the section 9 in its inclined position as shown in Figure 2. During this movement the section 10 tends to lean against the inner surface of the section 11 because the links 22 are pivoted to section 10 at 33 which latter pivot is positioned to the right, Figure 2, of the center of gravity of the section 10. Accordingly, the section 10 tends to fall to the left and this keeps it in engagement with the section 11 and during the latter portion of its movement with the section 9. Furthermore, the lengths of the arm 23 and the links 22 are such that the latter links lean to the left, Figure 2, in all positions of the arm 23 so that the weight of the section 10 also tends to rock the links 22 to the left and thereby retain the section 10 in contact with the section 9 as the former descends. At the completion of its descent the section 10 comes to rest upon the shoulder 34 of the section 9 as shown in Figure 3. This places the section 10 in its normal assembled relation with respect to the section 9.

The section 11 is provided with a laterally extending wing 35 guided in a suitable guide groove in the supporting ring 36 which carries this core section. A connection 37 connects the wing 35 with a handle 38 similar to the handle 31. By manipulation of the handle 38 the operator may move the section 11 inwardly so as to separate it from the casting and to place it in the space vacated by the section 9. The mold sections 5 having been moved outwardly to free the outside of the casting, the latter may now be removed from the machine by means of suitable tongs.

When the casting has been removed the operator manipulates the handle 38 so as to restore the section 11 to its normal casting position. The cylinders 7 and 14 may now be operated to close the mold sections 5 and to return the sections 9 and 10 to their normal casting position. It will be noted that the section 10 has been placed in assembled relation with respect to the section 9 and when the latter is raised by operation of the piston rod 13 both sections are returned to the mold in their normal casting position.

It will be noted that in removing the section 10, once it has been separated from the casting by operation of the ejector 30, its subsequent movement is carried out entirely by gravity. It moves downwardly of its own weight retarded and controlled by the action of the dash-pot 28. It will be noted that this mechanism is so arranged as not to interfere with other functions of the machine. The support 25 is mounted on the trunnion 2 so that when, as is sometimes the case, the machine is tilted on its trunnions, the relation of the controlling mechanism for the section 10 is not disturbed.

It will be seen therefore, that this invention accomplishes its objects in providing a machine whereby the core sections may be successfully handled when one of the side sections must be withdrawn before the other from a mold in which the pistons is cast with its head up. The machine is power operated except so far as is necessary for hand manipulation to control the functioning thereof. The side mold sections 5 are withdrawn automatically and at the same time the core section 9 is moved downwardly and automatically moved to one side so as to clear the path of the section 10. The latter section as soon as released from the casting by operation of the ejector 30 is withdrawn under its own weight by the action of gravity. It is dropped gently to its position upon the shoulder 34 of the section 9 and is then placed in position for return to its normal position in the mold.

While the section 10 is handled automatically by means of the mechanism described, it may of course be handled manually. By dispensing with the arms 23 and the links 22 and providing one or more suitable handles upon the lower end of the section 10, the latter may be disengaged from the casting by hand after withdrawing the section 9 and may be extracted from the casting by hand and placed in its position upon the shoulder 34. The mechanism described however renders the action automatic and considerably more accurate.

While this invention has been described as embodied in a unitary machine it will be understood of course, that certain individual features or subcombinations of this device may be useful by themselves, without reference to other features or the complete combination, and that the employment of such individual features or subcombinations is contemplated by this invention and with the scope of the appended claims.

It is obvious that various changes may be made, within the scope of the appended claims, in the details of construction without departing from the spirit of this invention; it is understood, therefore, that the invention is not limited to the specific details shown or described.

Having described the invention what is claimed is:

1. In a molding machine of the character described having a mold, a sectional core including center and side sections, and means operating to withdraw the center section entirely from the casting and thereafter to tilt the same angularly to one side so as to move its tip out of the way for removal of a side section.

2. In a molding machine of the character described having a mold, a sectional core including center and side sections, and means operating to withdraw the center section entirely from the casting and thereafter to tilt the same angularly to one side so as to move its tip out of the way for removal of a side section, said means operating to position said center section to receive the side section thereon when removed.

3. In a molding machine of the character described having a mold, a sectional core including center and side sections, and means operating to withdraw the center section entirely from the casting and thereafter to tilt the same angularly to one side so as to move its tip out of the way for removal of a side section, said means operating to position said center section to receive the side section thereon when removed, and said tilting means operating upon return of said center section to right the same so as to return it with said side section thereon into the mold.

4. In a molding machine of the character described having a mold, a sectional core including center and side sections, means for guiding one of said side sections for removal by gravity from the mold, and friction means automatically checking the speed of movement of said section to prevent a damaging impact.

5. In a molding machine of the character described having a mold, a sectional core including center and side sections, means for guiding one of said side sections for removal by gravity from the mold, and a dash-pot connected to control the movement of said section.

6. In a molding machine of the character described having a mold, a sectional core including center and side sections, means operable to withdraw said center section from the mold having means acting after complete withdrawal to tilt said center section to one side, and means guiding one of said side sections while the same is being removed by gravity from the mold so as to position said side section when removed in assembled relation with said center section.

7. In a molding machine of the character described having a mold, a sectional core including center and side sections, means operable to withdraw said center section from the mold having means acting after complete withdrawal to tilt said center section to one side, and means guiding one of said side sections while the same is being removed by gravity from the mold so as to position said side section when removed in assembled relation with said center section, said tilting means operating upon return movement of said withdrawing means to right said assembled sections and return them into the mold.

8. In a molding machine of the character described having a mold, a sectional core including center and side sections, means operable to withdraw said center section from the mold having means acting after complete withdrawal to tilt said center section to one side, and means guiding one of said side sections while the same is being removed by gravity from the mold so as to position said side section when removed in assembled relation with said center section, and retarding means adapted to control the withdrawing movement of said side section.

9. In a molding machine of the character described having a mold, a sectional core including center and side sections, means operable to withdraw said center section from the mold having means acting after complete withdrawal to tilt said center section to one side, and movable means connected to one of said side sections adapted to guide the same for withdrawal by gravity from the mold.

10. In a molding machine of the character described having a mold, a sectional core including center and side sections, means operable to withdraw said center section from the mold having means acting after complete withdrawal to tilt said center section to one side, movable means connected to one of said side sections adapted to guide the same for withdrawal by gravity from the mold, and retarding means connected to said guiding means adapted to control the movement of said side section.

11. In a molding machine of the character described having a mold, a sectional core including center and side sections, means operable to withdraw said center section from the mold having means acting after complete withdrawal to tilt said center section to one side and means for controlling the movement of one of said side sections during withdrawal thereof from the mold constructed and arranged to cause the same to move along and be guided by the other side section until clear of the casting.

12. In a molding machine of the character described having a mold, a sectional core including center and side sections, means operable to withdraw said center section from the mold having means acting after complete withdrawal to tilt said center section to one side and means for controlling the movement of one of said side sections during withdrawal thereof from the mold adapted to cause the same to move along and be guided by the other side section until clear of the casting, and thereafter to move along said tilted center section to a seat thereon.

13. In a molding machine of the character described having a mold, a sectional core including center and side sections, means operable to withdraw said center section from the mold having means acting after complete withdrawal to tilt said center section to one side, means for breaking one or both side sections from the casting, and means for controlling the movement of one of said side sections during withdrawal thereof from the mold adapted to cause the same to move along and be guided by the other side section until clear of the casting, and thereafter to move along said tilted center section to seat thereon.

JOHN FLAMMANG.
PERCY L. BOWSER.